US009626007B2

(12) United States Patent
Liang et al.

(10) Patent No.: US 9,626,007 B2
(45) Date of Patent: Apr. 18, 2017

(54) IMAGE SENSING METHOD, AND IMAGE SENSING APPARATUS, LIGHT SOURCE DETERMINING SYSTEM UTILIZING THE IMAGE SENSING METHOD

(71) Applicant: PixArt Imaging Inc., Hsin-Chu (TW)

(72) Inventors: Chia-Cheun Liang, Hsin-Chu (TW);
Wen-Yu Yang, Hsin-Chu (TW);
Chao-Chien Huang, Hsin-Chu (TW);
Chi-Yang Huang, Hsin-Chu (TW);
Hung-Yu Lee, Hsin-Chu (TW);
Ming-Tsan Kao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 485 days.

(21) Appl. No.: 13/802,849

(22) Filed: Mar. 14, 2013

(65) Prior Publication Data

US 2014/0028552 A1    Jan. 30, 2014

(30) Foreign Application Priority Data

Jul. 24, 2012   (TW) .............................. 101126593 A

(51) Int. Cl.
*G06F 3/033* (2013.01)
*G06F 3/03* (2006.01)
*G06F 3/0346* (2013.01)

(52) U.S. Cl.
CPC ............ *G06F 3/033* (2013.01); *G06F 3/0325* (2013.01); *G06F 3/0346* (2013.01)

(58) Field of Classification Search
CPC ...... G06F 3/033; G06F 3/0304; G06F 3/0325; G06F 3/0346; G06F 3/0308
USPC .......................... 345/157, 158, 160, 166, 156
See application file for complete search history.

(56) References Cited

U.S. PATENT DOCUMENTS

| 6,280,327 | B1 | 8/2001 | Leifer |
|---|---|---|---|
| 7,399,953 | B2* | 7/2008 | Xie ........................ G06F 3/0383 235/455 |
| 7,655,937 | B2 | 2/2010 | Hotelling |
| 8,717,348 | B2* | 5/2014 | Basile ..................... G09G 3/003 345/1.2 |
| 2009/0051651 | A1* | 2/2009 | Han .................. H04N 21/42221 345/158 |
| 2009/0140980 | A1 | 6/2009 | Morimoto |
| 2010/0309120 | A1* | 12/2010 | Kim ....................... G06F 3/0321 345/157 |

(Continued)

FOREIGN PATENT DOCUMENTS

CN            1955898 A       5/2007
CN          101430625 A       5/2009

(Continued)

*Primary Examiner* — Thomas Alunkal
(74) *Attorney, Agent, or Firm* — Winston Hsu; Scott Margo

(57) ABSTRACT

An image detecting method, comprising: controlling a synchronizing controller to transmit a first activating signal to a light source controller; controlling the light source controller to control at least one light source to generate a predetermined radiating pattern, and controlling the light source controller to transmit back a first responding signal to the synchronizing controller when the light source controller receives the first activating signal; and controlling an image sensor to start an image detecting when the synchronizing controller receives the first responding signal.

3 Claims, 10 Drawing Sheets

(56) References Cited

U.S. PATENT DOCUMENTS

| | | | |
|---|---|---|---|
| 2011/0188845 A1 | 8/2011 | Hanayama | |
| 2013/0089334 A1* | 4/2013 | Lin | G08C 23/04 |
| | | | 398/106 |
| 2013/0100022 A1* | 4/2013 | Thompson | G06F 3/033 |
| | | | 345/163 |

FOREIGN PATENT DOCUMENTS

| | | |
|---|---|---|
| CN | 102143320 A | 8/2011 |
| EP | 2 261 774 A1 | 12/2010 |
| TW | I330804 | 9/2010 |
| TW | 201043304 | 12/2010 |
| TW | I368530 | 7/2012 |
| WO | 2007078021 A1 | 7/2007 |

* cited by examiner

IMAGE SENSING METHOD, AND IMAGE SENSING APPARATUS, LIGHT SOURCE DETERMINING SYSTEM UTILIZING THE IMAGE SENSING METHOD

BACKGROUND OF THE INVENTION

1. Field of the Invention

The present invention relates to an image sensing method, and an image sensing apparatus, a light source determining system utilizing the image sensing method, and particularly relates to an image sensing method which synchronizes the light emitting operation and the image detecting, and an image sensing apparatus, a light source determining system utilizing the image sensing method.

2. Description of the Prior Art

FIG. 1 is a schematic diagram illustrating a prior art displacement detecting apparatus 100. As shown in FIG. 1, the displacement detecting apparatus 100 includes a controller 101 and a display 103. The display 103 includes a light source 105, and the controller 101 includes an image sensor 107. The cursor Cr on the display 103 can be controlled depending on the movement between the display 103 and the controller 101. Also, in order to compute the movement of the controller 101, the location information of the controller 101 for different time should be computed thus the movement of the controller 101 can be computed accordingly. One of the methods for computing the location information of the controller 101 is utilizing the source 105 as a reference point, and computing the location information for the controller 101 according to the reference point. Therefore, the image sensor 107 is utilized to catch an image, and to determine the location of the light source's object image in the image.

However, image components from different lights sources besides the image generated by the light source 105 are also comprised in the image caught by the image sensor 107. For example, the image generated by the environment light or the image displayed by the display 103. These undesired images may increase the complexity for determining the location of the light source 105. Therefore, a determining mechanism is needed to make sure that the image sensor 107 can correctly sense the image for the light source 105 and accurately sense the location for the light source 105.

SUMMARY OF THE INVENTION

Therefore, one objective of the present invention is to provide an image detecting method, which can correctly detect an image of the light source.

One embodiment of the present invention provides an image detecting method, comprising: controlling a synchronizing controller to transmit a first activating signal to a light source controller; controlling the light source controller to control at least one light source to generate a predetermined radiating pattern, and controlling the light source controller to transmit back a first responding signal to the synchronizing controller when the light source controller receives the first activating signal; and controlling an image sensor to start an image detecting when the synchronizing controller receives the first responding signal.

Another embodiment of the present invention provides an image detecting apparatus utilizing the abovementioned image detecting method. The image detecting apparatus comprises: an image sensor; at least one light source; a synchronizing controller, for outputting a first activating signal; and a light source controller, for controlling at least one light source to generate a predetermined radiating pattern, and for transmitting back a first responding signal to the synchronizing controller after the light source controller receives the first activating signal; wherein the synchronizing controller controls the image sensor to start an image detecting after the synchronizing controller receives the first responding signal.

Another embodiment of the present invention provides a light source determining system utilizing the abovementioned image detecting method. The light source determining system comprises: a display, comprising at least one light source provided thereon; a controller, comprising an image sensor and a synchronizing controller, wherein the image sensor catches a image and computes a location of the light source's object image in the image, and the synchronizing controller outputs a first activating signal; and a light source controller, for controlling the light source to generate a predetermined radiating pattern, and for transmitting back a first responding signal to the synchronizing controller after the light source controller receives the first activating signal; wherein the synchronizing controller controls the image sensor to start an image detecting after the synchronizing controller receives the first responding signal.

Another embodiment of the present invention provides an image detecting method, comprising: controlling a synchronizing controller to transmit a activating signal to a light source controller; controlling the synchronizing controller to estimate an activation starting time of the light source based on a time period that the synchronizing controller utilizes to transmit the activating signal, to control an image sensor to start an image detecting; and controlling at least one light source to generate a predetermined radiating pattern after the light source controller receives the activating signal.

Another embodiment of the present invention provides an image detecting apparatus utilizing the abovementioned image detecting method. The image detecting apparatus comprises: an image sensor; at least one light source; a light source controller; and a synchronizing controller, for transmitting a activating signal to the light source controller, and for estimating an activation starting time of the light source based on a time period that the synchronizing controller utilizes to transmit the activating signal, to control the image sensor to start an image detecting; and wherein the light source controller controls at least one light source to generate a predetermined radiating pattern after the light source controller receives the activating signal.

Another embodiment of the present invention provides a light source determining system utilizing the abovementioned image detecting method. The light source determining system comprises: a display, comprising at least one light source provided thereon; a light source controller; a controller, comprising an image sensor and a synchronizing controller, wherein the image sensor catches a image and computes a location of the light source's object image in the image, wherein the synchronizing controller estimates an activation starting time of the light source based on a time period that the synchronizing controller utilizes to transmit the activating signal, to control the image sensor to start an image detecting; and wherein the light source controller controls at least one light source to generate a predetermined radiating pattern after the light source controller receives the activating signal.

In view of abovementioned embodiments, the image detecting can be more accurate and the location for the light source can be more correctly determined, via above-mentioned synchronizing operations and wrong image discarding operations. Also, the light source or the image sensor can be activated only when they are needed, to save power consumption.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
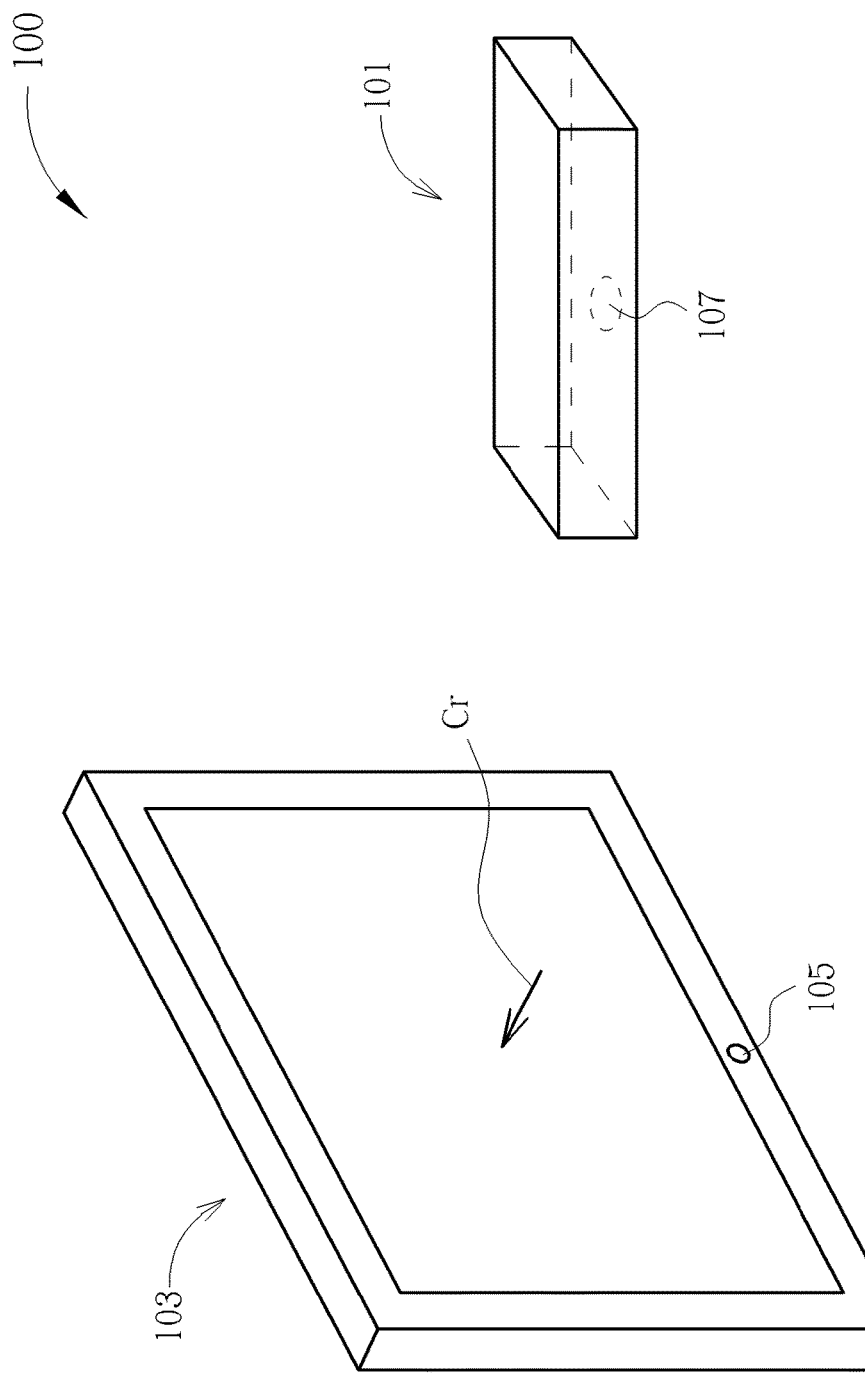
FIG. 1 is a schematic diagram illustrating a prior art displacement detecting apparatus.
Figure 2:
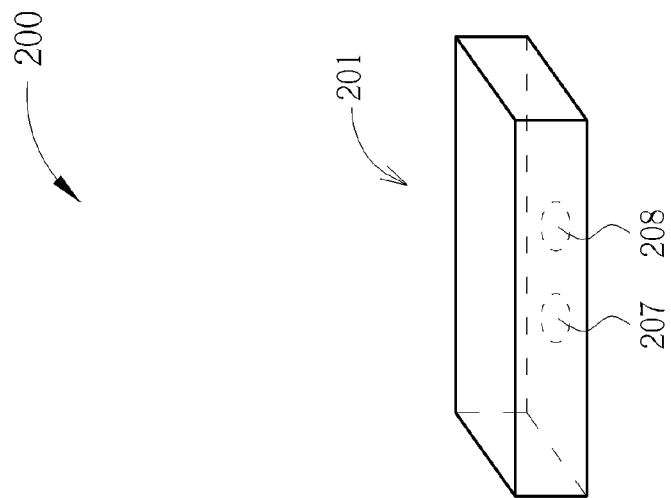
FIG. 2 is a schematic diagram illustrating a displacement detecting apparatus according to one embodiment of the present invention.
Figure 2:
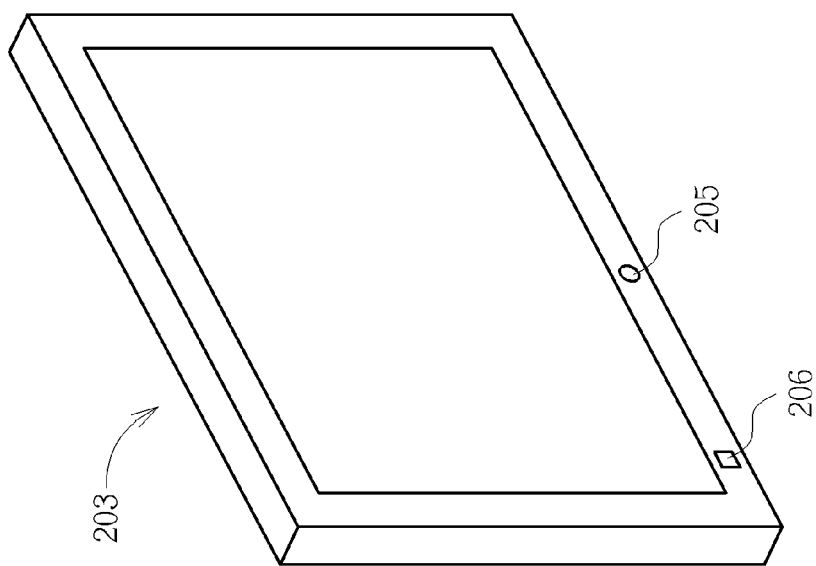

FIG. 2 is a schematic diagram illustrating a displacement detecting apparatus 200 according to one embodiment of the present invention. Please note the device shape, the device location and the device amount shown in FIG. 2 are only for example and do not meant to limit the scope of the present invention. In the embodiment shown in FIG. 2, the displacement detecting apparatus 200, which is similar with the displacement detecting apparatus 100, includes the controller 201 and a display 203. The display 203 also includes a light source 205 provided thereon, and the controller 201 also includes an image sensor 207. Additionally, the controller 201 further includes a synchronizing controller 208, and the display 203 includes a light source controller 206. The synchronizing controller 208 sends a signal to the light source controller 206 to control the image sensor 207, such that the operations of the light source 205 and the image sensor 207 can be synchronized. In one embodiment, RF signals can be applied to the signal transmitting between the light source controller 206 and the synchronizing controller 208, but not limited. RF channels, which are originally utilized to transmit coordinates or other data can be utilized for synchronizing. For example, the signal for synchronization and other data can be integrated to the same package and then transmitting the package. Alternatively, other data can be transmitted via other time periods which are not utilized and cause no conflict, while transmitting signals for synchronizing.

The operation of the displacement detecting apparatus 200 is explained for more detail in the following concept. However, please note the displacement detecting apparatus is utilized to explain above-mentioned embodiments, but the operation after determining the light source location is not limited to move the cursor on the display according to the movement of the controller. Therefore, the displacement detecting apparatus 200 can also be regarded as a light source determining system for determining a location of the light source. Additionally, the light source 205, the light source controller 206, the image sensor 207 and the synchronizing controller 208 can be regarded as an image detecting apparatus, to generate and to detect an image including the imaging of the light source 205.

Figure 3:
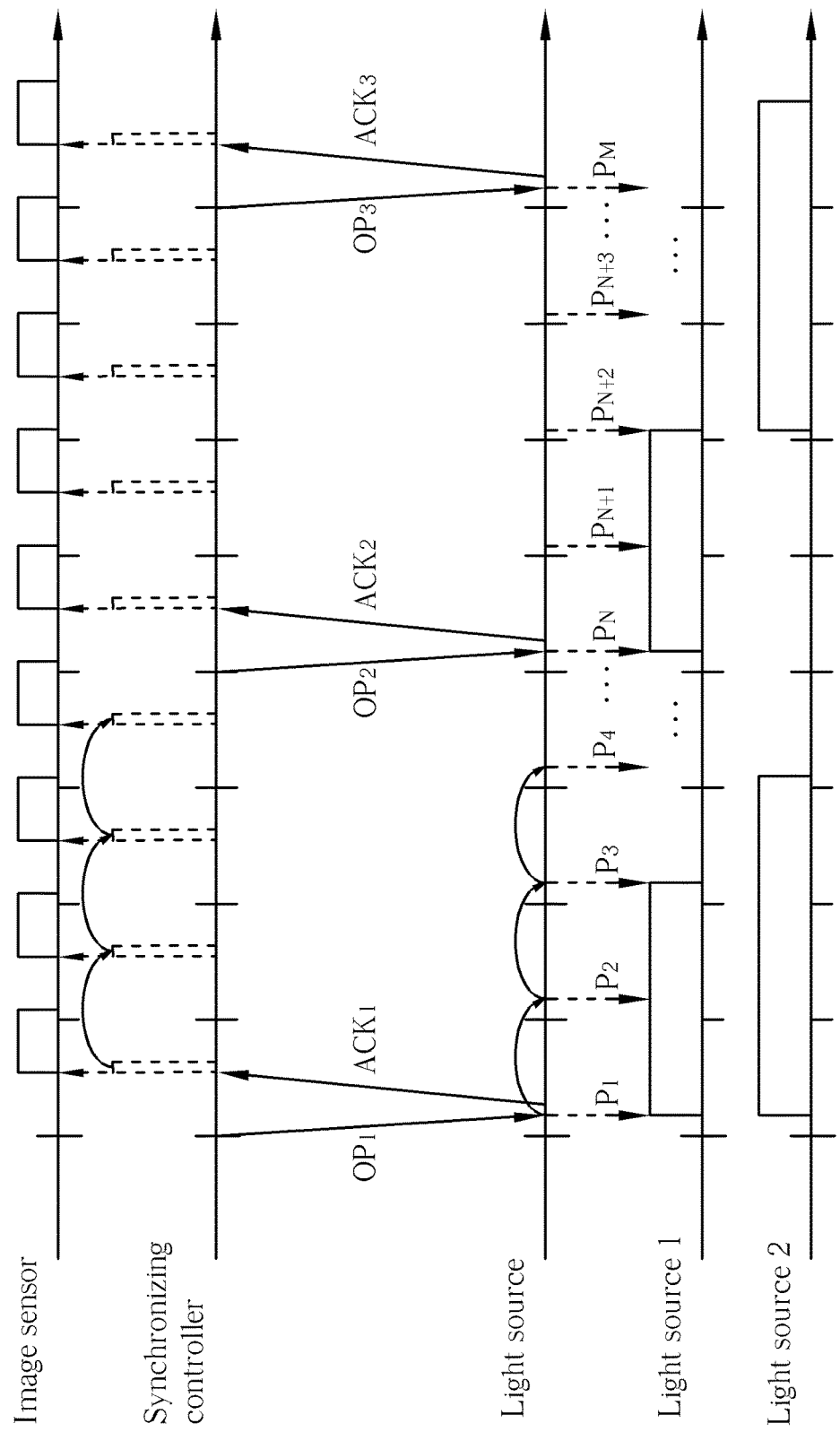
FIG. 3 to FIG. 8 are schematic diagrams illustrating the operations for the displacement detecting apparatus shown in FIG. 2.
Figure 4:
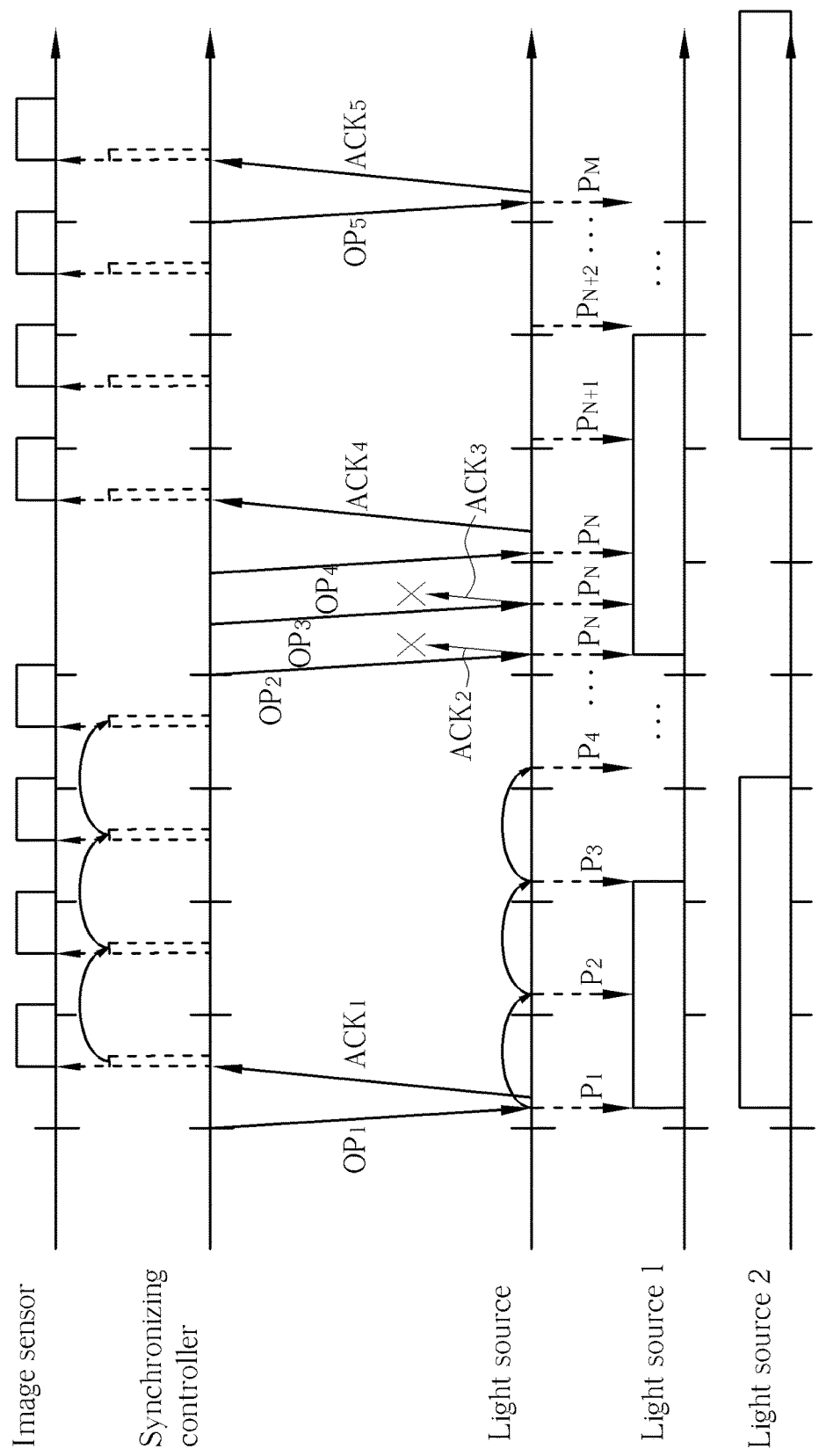
Figure 5:
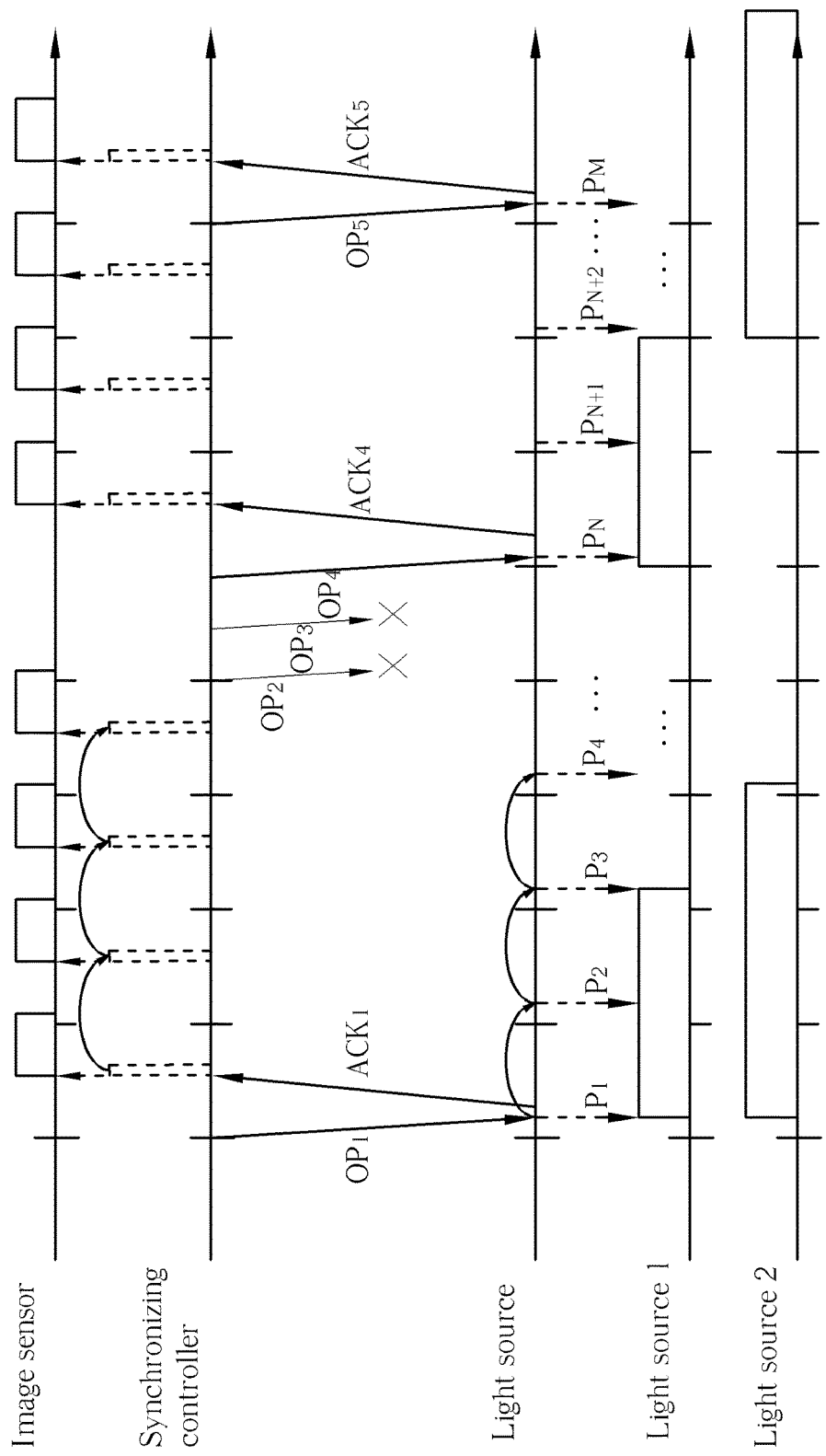
Figure 6:
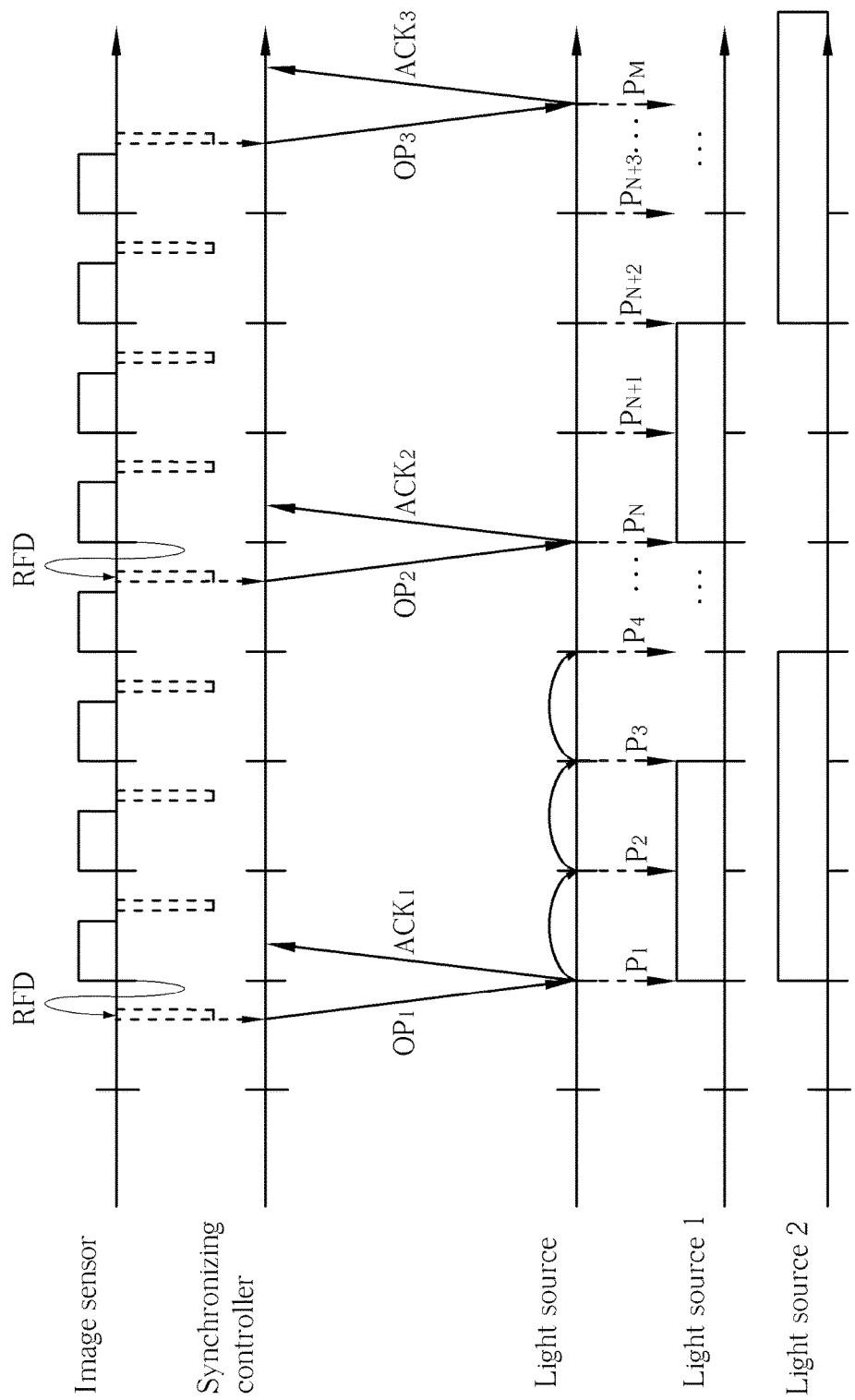
Figure 7:
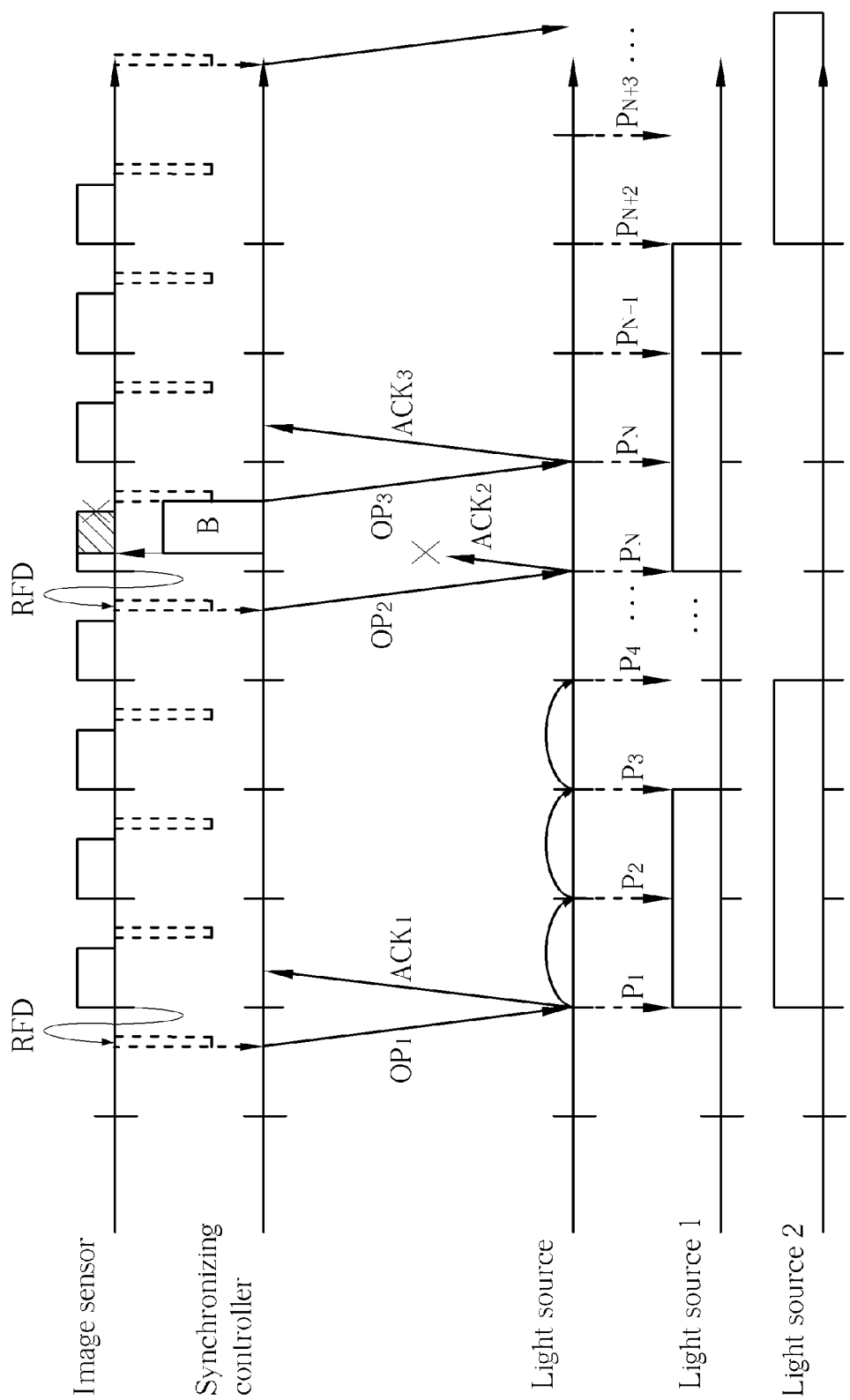
Figure 8:
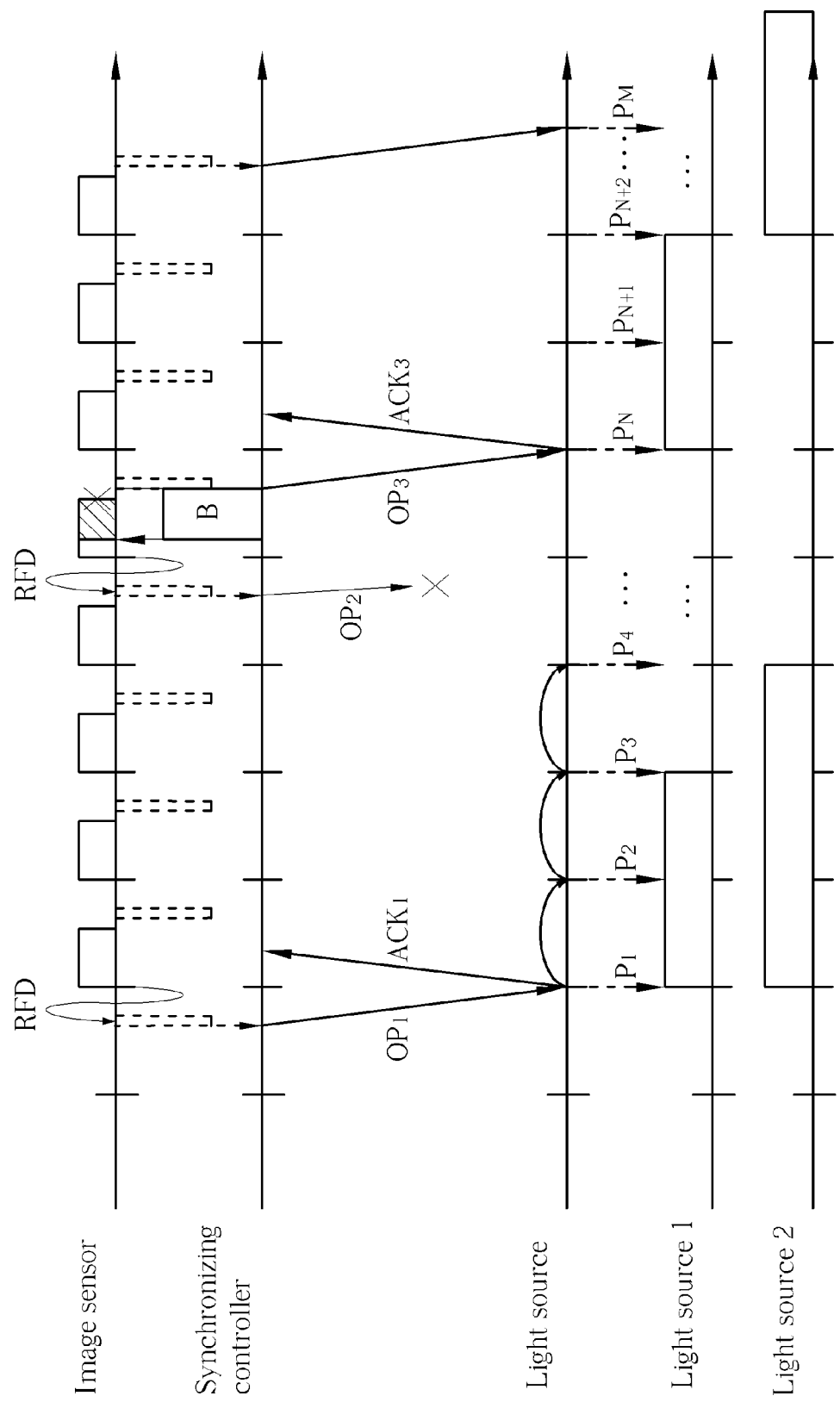

FIG. 3 to FIG. 8 are schematic diagrams illustrating the operations for the displacement detecting apparatus shown in FIG. 2. FIG. 3 illustrates the first embodiment of the present invention, while FIG. 4 and FIG. 5 illustrate extension examples of the first embodiment. FIG. 6 illustrates the second embodiment of the present invention, while FIG. 7 and FIG. 8 illustrate extension examples of the second embodiment. As shown in FIG. 3, the controller transmits an activating signal $OP_1$ to the light source controller. The light source controller controls at least one light source to start generating a predetermined radiating pattern after receives the activating signal $OP_1$. Please note two light sources: light source 1 and light source 2 are utilized to explain this embodiment, but it does not mean to limit the present invention. The predetermined radiating pattern indicates a predetermined light/dark sequence exists for the light generated by the light source 1 and the light source 2. For example, in the embodiment shown in FIG. 3, the light/dark sequence for the light generated by the light source 1 in time periods $P_1$ to $P_4$ is light, light, dark, dark (the light pattern after the time period 4 is omitted for brevity here), and the light/dark sequence for the light generated by the light source 2 in time periods $P_1$ to $P_4$ is light, light, light, dark. The light source 1 and light source 2 regenerate the predetermined radiating pattern again while receiving the next activating signal $OP_1$. Please note, the predetermined radiating pattern corresponding to different activating signals can be the same but also can be different.

The light source controller respectively transmits back responding signals $ACK_1$, $ACK_2$, $ACK_3$ to the synchronizing controller while receiving activating signals $OP_1$, $OP_2$ and $OP_3$. Moreover, the synchronizing controller controls the image sensor to perform image detecting while receiving the responding signals $ACK_1$, $ACK_2$, $ACK_3$. Via this mechanism, the image detecting of the image sensor and the predetermined radiating pattern generating operation of the light source can be synchronized.

Many mechanisms can be utilized to determine the location for the light source utilized for reference, after the image sensor and the light source both start their operations. Take the embodiment shown in FIG. 3 for example, the predetermined radiating pattern for the light source 1 and light source 2 can be pre-stored, and then the image sensor determines which part of the image emits light meeting the predetermined radiating pattern after catching successive images. By this way, the needed light source can be determined, and accordingly the locations for the light sources 1 or 2 can be determined. It should be noted that such method not only can be applied to the situation that two light source exist, but also can be applied to the situation that only one light source or more than two light sources exist.

Additionally, if a number of the light sources is 2 or more than 2, the light sources can utilize the same radiating pattern but having different phase differences. For example, the light source 1 and the light source 2 have the same radiating pattern (i.e. the same light/dark sequence), but the radiating pattern of the light source 2 has some delay comparing with which of the light source 1. Therefore, the image sensor determines or identifies these light sources according to the phase difference. The delay between the radiating patterns of the light source 1 and the light source 2 can be represented in different manners. One of which is "frame amount delay", that is, utilizing the frame amount to indicate the delay amount. For example, the light source 1 starts emitting light while the image sensor 207 catches a N-th image (N is a positive integer), but the light source 2 starts emitting light while the image sensor 207 catches an (N+1)th image.

In the embodiment shown in FIG. 3, if the synchronizing controller does not receive a corresponding responding signal after outputting the activating signal for a predetermined time period, the synchronizing controller transmits another activating signal to the light source controller. The light source controller transmits back a corresponding responding signal to the synchronizing controller after receiving the activating signal. Also, the image sensor performs no image detection unless the synchronizing controller receives a responding signal. There are two possible reasons for such situation: one of them is the light source controller has received the activating signal OP from the synchronizing controller and also has responded the responding signal ACK, but the synchronizing controller fails to receive the responding signal ACK. Or, the light source fails to receive the activating signal OP thus can not generate any responding signal ACK to the synchronizing controller. FIG. 4 and FIG. 5 respectively illustrate these two situations.

As shown in FIG. 4, the light source controller correctly responds the responding signal $ACK_1$ to the synchronizing controller after the synchronizing controller transmits the activating signal $OP_1$ to the light source controller, thus the light sources 1, 2 and the image sensor operate normally as the embodiment shown in FIG. 3. The light source controller responds the responding signals $ACK_2$ and $ACK_3$ after the synchronizing controller transmits the activating signals $OP_2$, $OP_3$ to the light source controller, but the synchronizing controller fails to receive the responding signals $ACK_2$ and $ACK_3$. The synchronizing controller correctly receives the responding signal $ACK_4$ generated by the light source controller until the synchronizing controller transmits the activating signals $OP_4$ to the light source controller. In such case, the light sources 1 and 2 repeatedly regenerate the predetermined radiating pattern while receiving the activating signals $OP_2$, $OP_3$ and $OP_4$. The synchronizing controller does not control the image sensor to start activating since no responding signals $ACK_2$ and $ACK_3$ are received. Once receiving the responding signal $ACK_4$, the synchronizing controller controls the image sensor to start an image detecting.

FIG. 5 illustrates a situation that the light source controller does not receive the activating signal. Similarly, the light source controller correctly responds the responding signal $ACK_1$ to the synchronizing controller after the synchronizing controller transmits the activating signal $OP_1$ to the light source controller, thus the light sources 1, 2 and the image sensor operate normally as the embodiment shown in FIG. 3. However, the light source can not respond any responding signal to the synchronizing controller after the synchronizing controller transmits the activating signals $OP_2$ and $OP_3$ to the light source controller, since the light source controller fail to receive the activating signals $OP_2$ and $OP_3$. In such case, neither the image sensor nor the light source operate, until the synchronizing controller correctly transmits the activating signal $OP_4$ to the light source controller and the light source controller responds the responding signal $ACK_4$ as well.

FIG. 6 to FIG. 8 illustrate a second embodiment of the present invention. AS shown in FIG. 6, the synchronizing controller estimates the activating starting time of the light source controller according to the time period for transmitting the activating signal $OP_1$ after transmits the activating signals $OP_1$, $OP_2$ and $OP_3$. Therefore the synchronizing controller controls the image sensor to start image detecting before receives the responding signals $ACK_1$, $ACK_2$ and $ACK_3$. In one embodiment, the synchronizing controller estimates the activating starting time of the light source controller according to RF delay (other delay time may be added if need). The light source controller controls the light sources 1, 2 to start generating a predetermined radiating pattern after receiving the activating signals $OP_1$, $OP_2$, $OP_3$, the same as the operation shown in FIG. 3.

In the embodiment shown in FIG. 7, the light source controller can correctly receive the activating signal $OP_1$ and generate the responding signal $ACK_1$, thus the image sensor and light sources 1, can operate as the embodiment shown in FIG. 6. However, the synchronizing controller can not correctly receive the responding signal $ACK_2$ although the light source controller correctly receive the activating signal $OP_2$ from the synchronizing controller and responds the responding signal $ACK_2$. In such case, wrong images are caught since the synchronizing controller finds it fails to receive the responding signal $ACK_2$ it should receive after the image detecting starts. Accordingly, the wrong image is discarded (the operation B in FIG. 7), and an activating signal $OP_3$ is output again. The light source controller controls the light sources 1, 2 to regenerate the predetermined radiating patterns after receiving the activating signal $OP_2$ or $OP_3$. Such operations are repeated, until the synchronizing controller receives the responding signal it should receive.

In the embodiment shown in FIG. 8, the light source controller can correctively receive the activating signal $OP_1$ and generate the responding signal $ACK_1$, the same as the operation shown in FIG. 7. However, the light source controller fails to receive the activating signal $OP_2$ generated by the synchronizing controller. The synchronizing controller finds it fails to receive the responding signal $ACK_2$ it should receive after the image detecting starts, thus wrong image is discard the same as the operation shown in FIG. 7 (the operation B in FIG. 8). The light source controller controls the light sources 1, 2 to perform no operations since no activating signal $OP_2$ is received, after generation of the activating signal $OP_2$. However, the light source controller controls the light sources 1, 2 to regenerate the predetermined radiating pattern after receives the activating signal $OP_3$.

Figure 9:
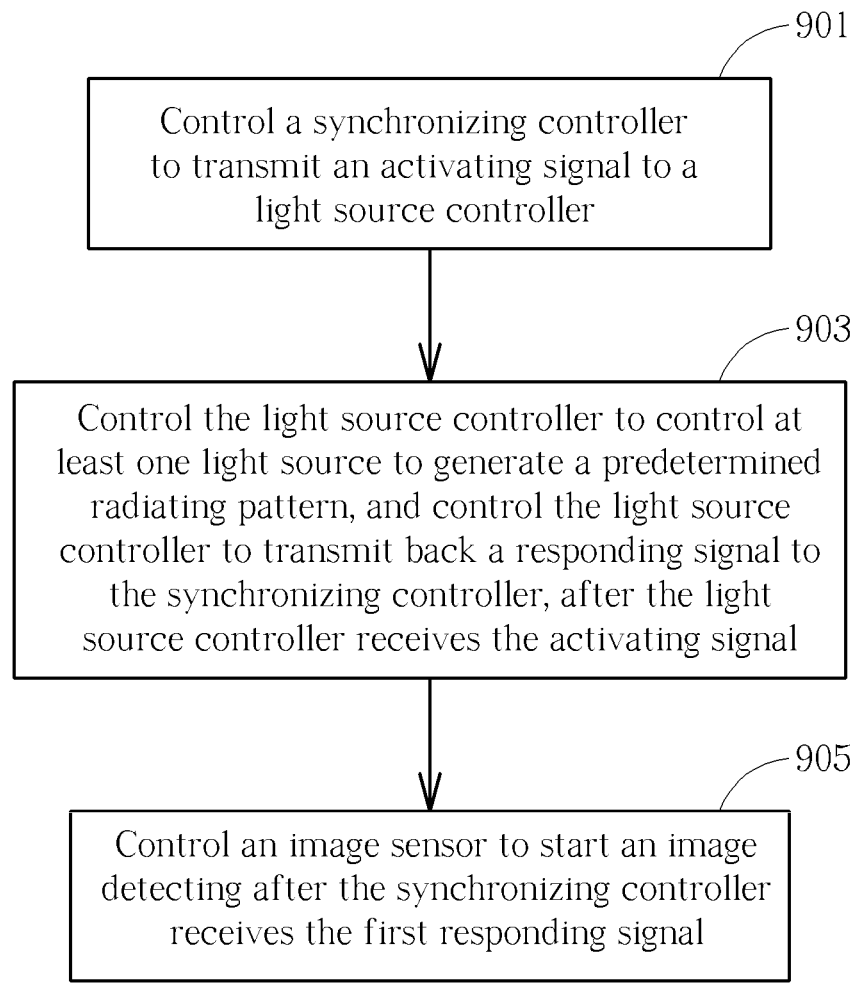
FIG. 9 and FIG. 10 are flow charts illustrating the image sensing method according to the embodiment of the present invention.
Figure 10:
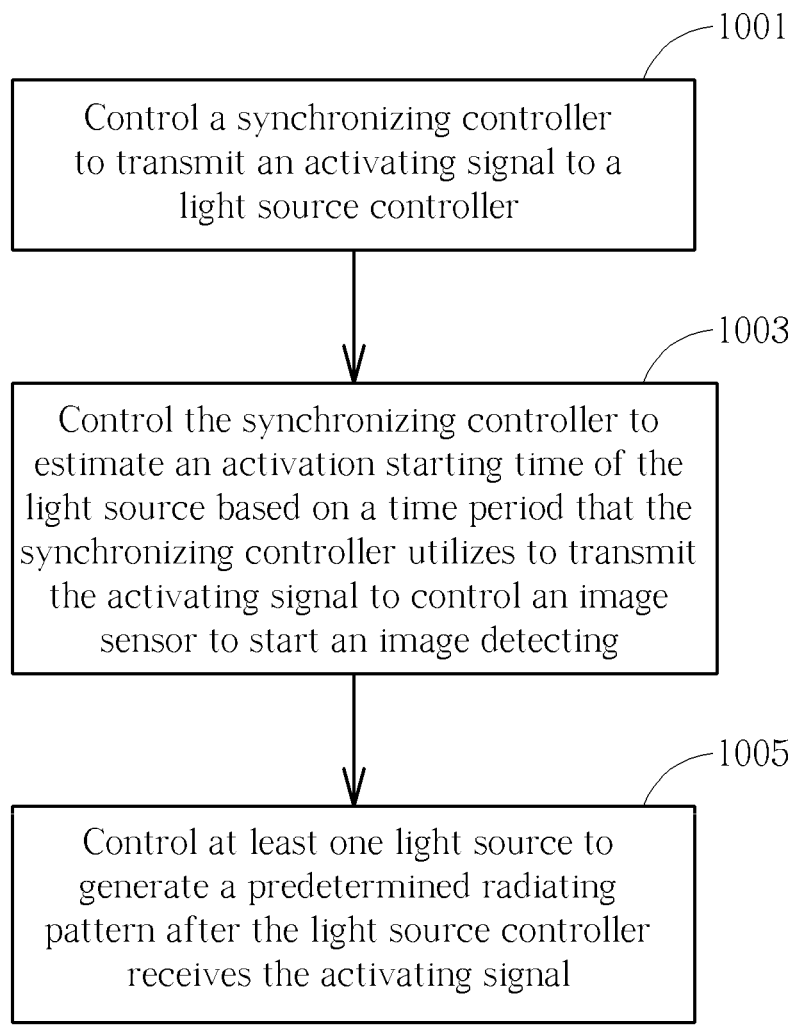

In view of above-mentioned embodiments, an image detecting method can be acquired, as shown in FIG. 9 and FIG. 10. FIG. 9 corresponds the embodiments shown in FIG. 3 to FIG. 5, and FIG. 10 corresponds the embodiments shown in FIG. 6 to FIG. 8.

FIG. 9 includes the following steps:

Step 901

Control a synchronizing controller (ex. 208 in FIG. 2) to transmit an activating signal to a light source controller (ex. 206 in FIG. 2).

Step 903

Control the light source controller to control at least one light source to generate a predetermined radiating pattern, and control the light source controller to transmit back a responding signal (ex. ACK$_1$, ACK$_2$, ACK$_3$ in FIG. 3) to the synchronizing controller, after the light source controller receives the activating signal (ex. OP$_1$, OP$_2$, OP$_3$ in FIG. 3).

Step 905

Control an image sensor to start an image detecting after the synchronizing controller receives the first responding signal.

FIG. 10 includes the following steps:

Step 1001

Control a synchronizing controller (ex. 208 in FIG. 2) to transmit an activating signal to a light source controller (ex. 206 in FIG. 2).

Step 1003

Control the synchronizing controller to estimate an activation starting time of the light source based on a time period that the synchronizing controller utilizes to transmit the activating signal (ex. based on RF delay time), to control an image sensor to start an image detecting.

Step 1005

Control at least one light source to generate a predetermined radiating pattern after the light source controller receives the activating signal.

In view of abovementioned embodiments, the image detecting can be more accurate and the location for the light source can be more correctly determined, via above-mentioned synchronizing operations and wrong image discarding operations. Also, the light source or the image sensor can be activated only when they are needed, to save power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image detecting method, comprising:
   controlling a synchronizing controller to transmit a first activating signal to a light source controller;
   controlling the light source controller to control a single light source to generate a first predetermined radiating pattern, and controlling the light source controller to transmit back a first responding signal to the synchronizing controller when the light source controller receives the first activating signal;
   controlling an image sensor to start an image detecting when the synchronizing controller receives the first responding signal;
   controlling the synchronizing controller to transmit a second activating signal to the light source controller;
   controlling the light source controller to control the light source to generate a second predetermined radiating pattern, and controlling the light source controller to transmit back a second responding signal to the synchronizing controller when the light source controller receives the second activating signal, wherein the second predetermined radiating pattern is different from the first predetermined radiating pattern; and
   controlling an image sensor to start the image detecting when the synchronizing controller receives the second responding signal.

2. An image detecting apparatus, comprising:
   an image sensor;
   a single light source;
   a synchronizing controller, for outputting a first activating signal and a second activating signal; and
   a light source controller, for controlling the light source to generate a first predetermined radiating pattern and for transmitting back a first responding signal to the synchronizing controller after the light source controller receives the first activating signal;
   wherein the synchronizing controller controls the image sensor to start an image detecting after the synchronizing controller receives the first responding signal;
   wherein the light source controller controls the light source to generate a second predetermined radiating pattern, and controls the light source controller to transmit back a second responding signal to the synchronizing controller when the light source controller receives the second activating signal, wherein the second predetermined radiating pattern is different from the first predetermined radiating pattern;
   wherein the image sensor starts the image detecting when the synchronizing controller receives the second responding signal.

3. A light source determining system, comprising:
   a display, comprising a single light source provided thereon;
   a controller, comprising an image sensor and a synchronizing controller, wherein the image sensor catches a image and computes a location of the light source's object image in the image, and the synchronizing controller outputs a first activating signal and a second activating signal; and
   a light source controller, for controlling the light source to generate a predetermined radiating pattern, and for transmitting back a first responding signal to the synchronizing controller after the light source controller receives the first activating signal;
   wherein the synchronizing controller controls the image sensor to start an image detecting after the synchronizing controller receives the first responding signal;
   wherein the light source controller controls the light source to generate a second predetermined radiating pattern, and controls the light source controller to transmit back a second responding signal to the synchronizing controller when the light source controller receives the second activating signal, wherein the second predetermined radiating pattern is different from the first predetermined radiating pattern;
   wherein the image sensor starts the image detecting when the synchronizing controller receives the second responding signal.

* * * * *